United States Patent
Simon

(10) Patent No.: US 8,010,714 B2
(45) Date of Patent: Aug. 30, 2011

(54) METHOD FOR ASSIGNING ADDRESSES TO NODES OF A BUS SYSTEM, AND INSTALLATION

(75) Inventor: Olaf Simon, Bruchsal (DE)

(73) Assignee: Sew-Eurodrive GmbH & Co. KG, Bruchsal (DE)

( * ) Notice: Subject to any disclaimer, the term of this patent is extended or adjusted under 35 U.S.C. 154(b) by 313 days.

(21) Appl. No.: 12/095,113

(22) PCT Filed: Oct. 13, 2006

(86) PCT No.: PCT/EP2006/009901
§ 371 (c)(1),
(2), (4) Date: May 27, 2008

(87) PCT Pub. No.: WO2007/059823
PCT Pub. Date: May 31, 2007

(65) Prior Publication Data
US 2008/0307131 A1 Dec. 11, 2008

(30) Foreign Application Priority Data
Nov. 24, 2005 (DE) .................... 10 2005 056 294

(51) Int. Cl.
*G06F 3/00* (2006.01)
(52) U.S. Cl. ................... 710/9; 710/10; 710/110
(58) Field of Classification Search .............. 710/3, 4, 710/8–10, 15–19, 104, 105, 109, 110
See application file for complete search history.

(56) References Cited

U.S. PATENT DOCUMENTS

| 4,701,878 | A |   | 10/1987 | Gunkel et al. |
|-----------|---|---|---------|---------------|
| 5,481,750 | A | * | 1/1996  | Parise et al. .................... 709/220 |
| 5,551,053 | A | * | 8/1996  | Nadolski et al. .................. 710/9 |
| 5,675,830 | A | * | 10/1997 | Satula ............................... 710/9 |
| 5,787,306 | A | * | 7/1998  | Michael ............................ 710/9 |
| 6,216,172 | B1 |  | 4/2001  | Kolblin et al. |
| 6,594,630 | B1 | * | 7/2003 | Zlokarnik et al. ......... 704/256.5 |
| 6,850,992 | B2 |  | 2/2005  | Heinrich et al. |
| 7,111,100 | B2 | * | 9/2006 | Ellerbrock .................... 710/300 |
| 7,328,286 | B2 | * | 2/2008 | Vinnemann ...................... 710/9 |

(Continued)

FOREIGN PATENT DOCUMENTS
DE 33 47 357 7/1985
(Continued)

OTHER PUBLICATIONS international Bureau, Translation of International Preliminary Report on Patentability, PCT International Patent Application No. PCT/EP2006/009901, Aug. 14, 2008.

(Continued)

*Primary Examiner* — Khanh Dang
(74) *Attorney, Agent, or Firm* — Kenyon & Kenyon LLP

(57) ABSTRACT

A method for assigning addresses to nodes of a bus system, and installation, bus nodes being furnished with an identical delivery address, where (i) an assigning entity, particularly a central computer, start-up computer or bus node sends information to the delivery address via the bus system, (ii) the information includes a first address, (iii) an action is performed whose effect is detected by a first bus node, (iv) the first bus node accepts the first address, (v) the first bus node sends a response to the assigning entity, and (vi) steps (i) through (v) are repeated, each time with a further address for a further bus node.

24 Claims, 1 Drawing Sheet

U.S. PATENT DOCUMENTS

Figure 1:
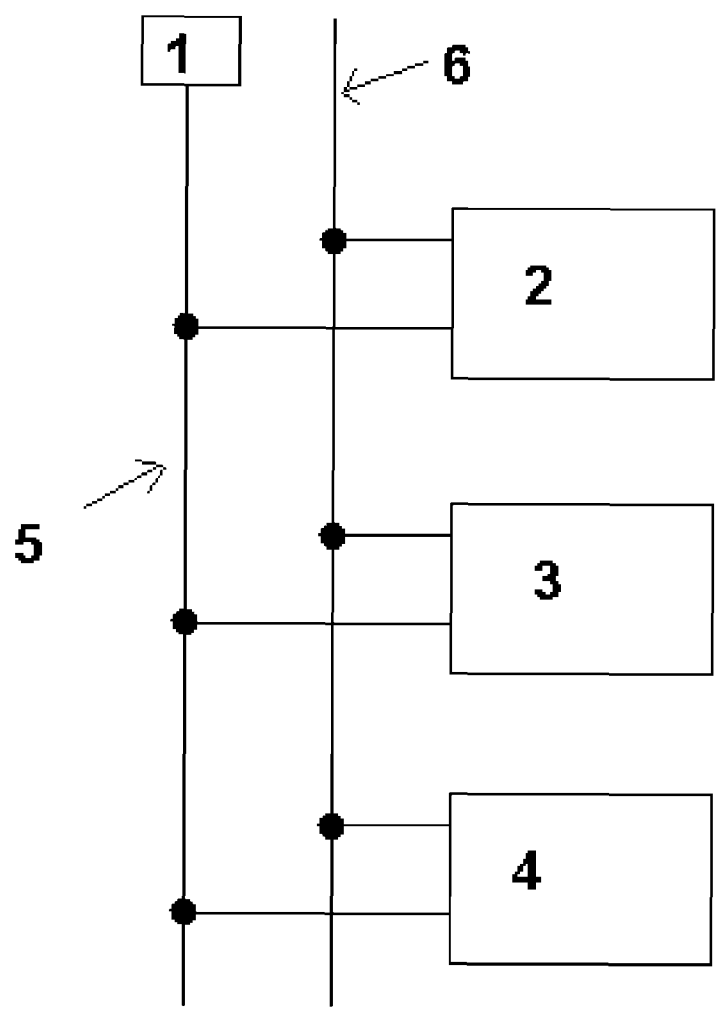

| | | | |
|---|---|---|---|
| 7,522,626 B2* | 4/2009 | Augustinus | 370/419 |
| 2002/0046309 A1* | 4/2002 | Boesinger et al. | 710/100 |
| 2003/0098661 A1* | 5/2003 | Stewart-Smith | 318/445 |
| 2004/0111500 A1* | 6/2004 | Rayburn | 709/222 |
| 2004/0199703 A1* | 10/2004 | Wurth et al. | 710/306 |
| 2008/0040515 A1 | 2/2008 | Schaetzle | |
| 2008/0177919 A1* | 7/2008 | Miyazawa | 710/110 |

FOREIGN PATENT DOCUMENTS

| | | |
|---|---|---|
| DE | 197 13 240 | 10/1998 |
| DE | 199 40 874 | 3/2001 |
| EP | 0 182 417 | 5/1986 |
| EP | 0 495 397 | 7/1992 |
| EP | 0 537 814 | 4/1993 |
| WO | WO 02/15452 | 2/2002 |
| WO | 2004/059917 | 7/2004 |
| WO | WO 2005/062140 | 7/2005 |

OTHER PUBLICATIONS

International Search Report, PCT International Patent Application No. PCT/EP2006/009901, dated Mar. 2, 2007.

* cited by examiner

METHOD FOR ASSIGNING ADDRESSES TO NODES OF A BUS SYSTEM, AND INSTALLATION

FIELD OF THE INVENTION

The present invention relates to a method for assigning addresses to nodes of a bus system, and an installation.

BACKGROUND INFORMATION

It is well-known to assign a fixed address to bus nodes with the aid of DIP switches during production or when put into operation. Thus, during the start-up of an installation having such bus nodes, each is assigned an address. Installations are also understood to be machines.

Alternatively, an address is assigned to a bus node such as a drive or the like when a computer for assigning parameters is connected and the address is imported by it.

SUMMARY

In the present application, the entire respective apparatus is denoted as bus node, thus, not only the electronics having bus capability, but also, for example, the entire associated drive including gear unit and motor. Another example is a decentralized controller.

Example embodiments of the present invention provide an easier assignment of addresses.

Among features of example embodiments of the present invention with respect to the method is that it is provided for assigning addresses to nodes of a bus system, bus nodes being furnished with an identical delivery address, where (i) an assigning entity, particularly a central computer, start-up computer or bus node sends information to the delivery address via the bus system, (ii) the information includes a first address, (iii) an action is performed whose effect is detected by a first bus node, (iv) the first bus node accepts the first address, (v) the first bus node sends a response to the assigning entity, and (vi) steps (i) through (v) are repeated, each time with a further address for a further bus node.

In this context, it may be provided that the start-up procedure is able to be carried out much faster, since it is no longer necessary to produce a connection to a start-up device, particularly a point-to-point connection to be implemented at each drive in succession; rather, only a simple action must be performed. For example, the operator is able to move through the installation and identify the drives one after another by various action triggerings. Thus, a successive activation is possible, and the address of the respective drive is assignable.

The action may be performed by a person. This provides that the operator must make a mere gesture or speak a special word. The bus node is appropriately implemented so that this action is recognizable, e.g., by an angle-of-rotation sensor or a voice-recognition system.

The addresses may be assigned in automated fashion during the production of at least one pre-completed installation part or the entire installation. This provides that an installation part is able to be produced in advance, and in so doing, the addresses are already assignable. In this case, the action is executable by the manufacturing machine or manufacturing facility for manufacturing the installation part.

In particular, the bus nodes are able to be realized such that, upon switching on the supply voltage to the installation, the bus nodes are fully brought on line with an individual time delay, so that the addresses are assigned as a function thereof. For example, the time delay is realizable by electronic components. In this manner, the addresses are even reassignable each time the installation is switched off and switched on again.

Not only the energy supply is used as supply voltage, but also the commutation of the 24-volt low-voltage supply or of signals from an inverter already addressed, to the following inverter in a serial cabling of this supply voltage or signal used for the control.

In an example embodiment, the action is a movement of a part of the bus node disposed in a manner allowing mechanical movement, such as a shaft, drive shaft, motor shaft, intermediate shaft, rotor, etc. An advantage is that sensors or components at hand in any case are usable for detecting the action.

The action may be a switching-in of the electrical energy supply for the bus node (be it control supply and/or energy supply). This provides that use is made of a particularly simple action necessary in any case. An especially rapid start-up is thus made possible.

The action may be a clearing of a controller inhibit, particularly a clamping of a wire jumper, at the bus node. An advantage in this case is that an action to be carried out anyway for safety reasons is able to be used.

In an example embodiment, for example, the action is the actuation of a digital input, thus applying a voltage, or pressing a switch or button. This provides that actions which can be performed particularly easily and quickly are able to be selected.

The action may be the operation of an actuation device such as a potentiometer, rotary knob, etc. This provides that particularly simple rotary movements are executable by hand and usable as action.

The action may be the actuation of an air interface or infrared interface. An advantage in this case is that a contact-free execution of the action is usable.

One kind of action from several kinds of actions may be used as action for each bus node. This provides that several kinds of actions, e.g., a turning of the potentiometer or an infrared pulse train, are usable.

The same kind of action may be used for each bus node. This provides that no improper action is able to trigger an address change.

Different kinds of actions may be used for different bus nodes. An advantage in this case is that a suitable action may be used depending on the type of bus node. For example, in the case of a drive as bus node, a shaft is rotatable, and given a controller as bus node, e.g., an input may be actuated, since depending on the design, such a controller cannot have a shaft, for example.

A broadcast telegram may be used in step (i). This provides that types of commands already available in any case are able to be used.

A broadcast telegram relates to telegram information sent to a plurality of nodes. A response first ensues after the completed action, thus is not initiated directly by the broadcast telegram. In this context, however, only the bus node to which the information has been sent responds.

The accepted address may be effective as address of the bus node in the bus system. This provides that the delivery address has overwrite capability and is able to be deactivated.

Among features with respect to the installation are that it includes a bus system having bus nodes, the bus nodes being able to be furnished with addresses according to a previously described method during production or start-up of the installation. In so doing, a stipulated assignment is favorable.

In this context, the addresses may be able to be stored in non-volatile fashion, and therefore after production or start-up, the bus nodes are able to receive information directed to this address. In particular, it is possible to dispense with DIP switches for setting the address.

Device(s) for performing at least one action may be provided at the bus node. This provides that an actuation device or a sensor for detecting an action is provided. In particular a sensor is used, which is available in any case.

Moreover, example embodiments of the present invention may provide that drives exchanged by the plant operator are able to be identified, and if it is a drive exchanged individually in the bus system, it can be set automatically to its valid address.

Further features and aspects of example embodiments of the present invention are described in more detail below with reference to the appended Figures.

LIST OF REFERENCE NUMERALS 1 central computer
2, 3, 4 bus nodes
5 data bus
6 energy supply

DETAILED DESCRIPTION

Example embodiments of the present invention are explained in more detail with reference to the Figures.

FIG. 1 shows a facility according to example embodiments of the present invention. It is an installation in which various devices, e.g., drives or decentralized electronic modules such as decentralized controllers are provided as bus nodes 2, 3, 4. Data is exchanged between bus nodes 2, 3, 4 and a central computer 1 via data bus 5.

In addition, bus nodes 2, 3, 4 are connected to an energy supply 6.

The bus nodes are to be furnished with an individual address in order to permit identification. Thus, data is able to be sent out to determinable receivers.

The method of example embodiments of the present invention for the addressing, thus an assignment of addresses to the bus nodes, is carried out in that during production of the bus node, its address is set to a delivery address.

During start-up of the installation, an address is assigned to each bus node. This is accomplished in that the central computer sends to the delivery address the information that the receiver of this message should set its address to the value sent along at the same time. This may be sent as a "broadcast telegram", thus in the form of a message intended for all connected bus nodes.

However, the respective bus node only executes this command if an additional action determinable beforehand takes place. After executing the command, the bus node—automatically or upon demand of the superordinate controller—signals back the completion of the execution to the central computer. It then repeats the sending of a message with a different address. However, the next bus node again only executes this command if in turn an additional action determinable beforehand takes place. The type of action is the same for all bus nodes.

Different actions are realized in different exemplary embodiments:

1) The switching-on of the energy supply is provided as a first exemplary action. Because it is provided that during the start-up, one bus node after the other receives this action, an individual address is ensured.

2) An alternative action is the movement of a part of the drive such as the shaft, etc.

3) Another alternative action is the clearing of a controller inhibit. For example, this is feasible by the clamping of a wire jumper at the bus node.

4) Another alternative action is able to be realized, for example, by the actuation of a digital input, thus applying a voltage or pressing a switch or button.

5) A further alternative action is practicable, for example, by the operation of an actuation means such as a potentiometer, rotary knob, etc.

6) Another alternative action is achievable, for example, by the actuation of an air interface or infrared interface, e.g., by transmitting a suitable signal.

In further exemplary embodiments, no central computer is present; rather, the function is carried out by a bus node or a computer connected temporarily by way of example to the data bus.

In further exemplary embodiments, the energy supply and the data transmission are accomplished in a manner integrated in one cable system. On one hand, this is possible via a hybrid cable system which includes power lines and bus lines, or by higher-frequency modulation of the bus information on the energy-supply cable.

In further exemplary embodiments, the bus nodes are fed in contactless fashion by the energy-supply system. In this case, a primary conductor is to be run in the installation, and the bus nodes are equipped with secondary coils which are able to be inductively coupled to the primary conductor, in order to switch in the energy supply for the bus node. For example, to that end, the primary conductor is wrapped around a housing area of the bus node.

Bus nodes may be drives. Inverters, inverter motors, decentralized controllers or decentralized electronic devices, etc., are usable as bus nodes, as well.

In further exemplary embodiments, a different type of action is assigned to each bus node. However, a number of actions are also assignable, so that in response to the occurrence of one of the actions at a bus node, the bus node executes the command and sends the response to the central computer.

The invention claimed is:

1. A method for assigning addresses to nodes of a bus system, bus nodes being furnished with an identical delivery address, comprising:
   (i) sending information to the delivery address via the bus system by an assigning entity, the information including a first address;
   (ii) performing an action;
   (iii) detecting an effect of the action by a first bus node;
   (iv) accepting the first address by the first bus node;
   (v) sending a response to the assigning entity by the first bus node, the response occurring after the performing the action, and the performing the action occurring after the sending the information; and
   (vi) repeating (i) to (v), each time with a further address for a further bus node.

2. The method according to claim 1, wherein the assigning entity includes at least one of (a) a central computer, (b) a start-up computer, and (c) a bus node.

3. The method according to claim 1, wherein the performing includes performing an action for identification.

4. The method according to claim 1, wherein the action is performed by a person.

5. The method according to claim 4, wherein the action includes one of (i) making a gesture and (ii) speaking.

6. The method according to claim 1, wherein the addresses are assigned in automated fashion during production of at least one of (a) at least one pre-completed installation part and (b) an entire installation.

7. The method according to claim 1, wherein the action includes a movement of a part of the bus node disposed in a manner allowing mechanical movement.

8. The method according to claim 7, wherein the part includes at least one of (a) a shaft, (b) a drive shaft, (c) a motor shaft, (d) an intermediate shaft, and (e) a rotor.

9. The method according to claim 1, wherein the action includes a switching-on of an electric energy supply for the bus node.

10. The method according to claim 1, wherein the action includes a switching-on of at east one of (a) an electric power-energy supply for the bus node, (b) a supply voltage for signal electronics, (c) a 24-volt supply voltage, and (d) a signal.

11. The method according to claim 1, wherein the bus nodes are arranged such that at least one of (a) an energy supply and (b) a signal-electronics supply voltage is switchable in series.

12. The method according to claim 11, wherein the bus node at least one of (a) switches in and (b) releases at least one of (a) the supply voltage and (b) the signals to a following bus node.

13. The method according to claim 1, wherein the action includes at least one of (a) a clearing of a controller inhibit and (b) a clamping of a wire jumper at the bus node.

14. The method according to claim 1, wherein the action includes at least one of (a) actuation of a digital input to apply a voltage and (b) pressing of at least one of (i) a switch and (ii) a button.

15. The method according to claim 1, wherein the action includes operation of at least one of (a) an actuation device, (b) a potentiometer, and (c) a rotary knob.

16. The method according to claim 1, wherein the action includes actuation of at least one of (a) an air interface and (b) an infrared interface.

17. The method according to claim 1, wherein one kind of action from several kinds of actions is used as action for each bus node.

18. The method according to claim 1, wherein a same kind of action is used for each bus node.

19. The method according to claim 1, wherein different kinds of actions are used for different bus nodes.

20. The method according to claim 1, wherein the information includes a broadcast telegram.

21. The method according to claim 20, wherein the response is not initiated directly by the broadcast telegram.

22. The method according to claim 1, wherein the accepted address is effective as an address of the bus node in the bus system.

23. An installation, comprising:
a bus system having bus nodes;
wherein during at least one of (a) production and (b) start-up of the installation, the bus nodes are furnished with addresses, the method including:
(i) sending information to the delivery address via the bus system by an assigning entity, the information including a first address;
(ii) performing an action;
(iii) detecting an effect of the action by a first bus node;
(iv) accepting the first address by the first bus node;
(v) sending a response to the assigning entity by the first bus node, the response occurring after the performing the action, and the performing the action occurring after the sending the information; and
(vi) repeating (i) to (v), each time with a further address for a further bus node.

24. The installation according to claim 23, further comprising a device configured to perform at least one action at the bus node.

* * * * *